United States Patent [19]

Grosseau

[11] 3,814,928

[45] June 4, 1974

[54] DEVICE FOR MOUNTING AN ELEMENT ON A SUPPORT

[75] Inventor: Albert Grosseau, Chaville, France

[73] Assignee: Societe Anonyme Automobiles Citroen, Paris, France

[22] Filed: Mar. 15, 1973

[21] Appl. No.: 341,754

Related U.S. Application Data

[63] Continuation-in-part of Ser. No. 45,612, June 12, 1970, abandoned.

[30] Foreign Application Priority Data

Mar. 16, 1972 France .............................. 72.09256
June 13, 1969 France .............................. 69.19837

[52] U.S. Cl. ..................... 240/57, 240/8.2, 240/90, 248/27, 248/223
[51] Int. Cl. .......................... F21v 21/00, B60g 1/00
[58] Field of Search ............. 240/8.1, 8.2, 8.22, 8.3, 240/52 R, 52.1, 57, 90, 152; 248/27, 223

[56] References Cited
UNITED STATES PATENTS 2,874,254  2/1959  Daily et al. ..................... 248/27 X
2,892,011  6/1959  Gleuckstein ...................... 248/27 X
3,130,921  4/1964  Morgan .............................. 240/8.2
3,354,303  11/1967  Manke ............................. 240/90 X
3,375,367  3/1968  Woodcock ....................... 240/90 X

FOREIGN PATENTS OR APPLICATIONS 1,202,155  9/1965  Germany ........................... 240/8.3

Primary Examiner—Joseph F. Peters, Jr.

[57] ABSTRACT

This invention relates to a device for mounting an element on a body support having an inner surface and an outer surface utilizing resilient clips formed integrally with said element, the clips adaptable to be inserted from the outside of the outer surface of the support into apertures formed in the support, the clips each provided with projections for locking the element on the support with the free ends of the clips being solely accessible from the inner surface of the support after the element is mounted. The invention also relates to a vehicle employing this device wherein the element is comprised of an optical unit and is mounted in a cavity or recess formed in the bodywork of the vehicle to receive the unit, and the bodywork provides the support for the optical unit.

5 Claims, 3 Drawing Figures

DEVICE FOR MOUNTING AN ELEMENT ON A SUPPORT

This is a continuation-in-part of my application Ser. No. 45,612 filed June 12, 1970, and entitled "Fixing Devices For Locking An Element To A Support," now abandoned.

BACKGROUND OF THE INVENTION

The present invention relates to a mounting device for securing or locking an element to a support, for example, for mounting a lighting or optical unit to the bodywork of a vehicle.

A number of embodiments are known in the field of devices for mounting an element to a support, among which certain specific mounting arrangements are particularly advantageous due to their simplicity and their ease and rapidity of use.

For example, it is known to secure the shade of a standard lamp on its stand by means of resilient clips formed unitary with the stand, the clips passing through the opening in the base of the shade and fastening the latter to the stand.

This embodiment is very satisfactory in the majority of cases, but sometimes has the disadvantage of not comprising a means of locking the element to its support.

In particular, it could be thought to mount, in this manner, the optical units used with vehicles as directional indicators, or the like, to the bodywork of vehicles, this presenting various advantages, particularly speed of positioning and cheapness of the assembly, inasmuch as a heretofore unknown device prevents any untimely dismantling, not desired by the owner of the vehicle, of the optical unit.

SUMMARY OF THE INVENTION

The invention proposes a mounting device which, among other advantages, retains the advantageous characteristics of the fixations by resilient clips, whilst remedying their disadvantages of non-locking features.

The invention therefore has for its subject a device for mounting an element to a support having an inner surface and an outer surface, resilient clips formed unitary with said element or attached thereto and capable of being inserted, from the outside of the outer face of the support into apertures made in the support.

The clips are provided with projections for locking the element to the support, whilst, when the element is in locked position on its support, the free ends of the clips are solely accessible from the inner face of the support.

In addition, when the element is in locked position on the support, the element advantageously abuts on this support by means of at least one centering boss formed integrally with one of the members and cooperating with at least one depression made in the other member.

A resilient member is preferably interposed between the centering bosses and the corresponding depressions.

Moreover, when the element is locked on the support, the outer face of said element is substantially in a plane coincident with the outer face of the support.

The invention also has for its subject a vehicle utilizing the preceding device in which the element comprises an optical unit and is mounted in a recess made in the bodywork of the vehicle, the bodywork constituting the support of the optical unit.

Finally, the invention has for its subject an alternative embodiment where there is provided an assembly of an element and a support therefor, the support having an outer surface with a cavity accommodating therein the element so that the outer surface of the element substantially forms a continuation of the outer surface of that part of the support surrounding the cavity, an innermost portion of the element being spaced from the corresponding innermost portion of the cavity by a resilient member capable of flexing by an amount which permits the element to move until the innermost portion thereof and the innermost portion of the cavity are substantially in contact.

BRIEF DESCRIPTION OF THE DRAWINGS

The invention will be described in greater detail with reference to the accompanying drawings, in which.

DESCRIPTION OF THE PREFERRED EMBODIMENTS

Figure 1:
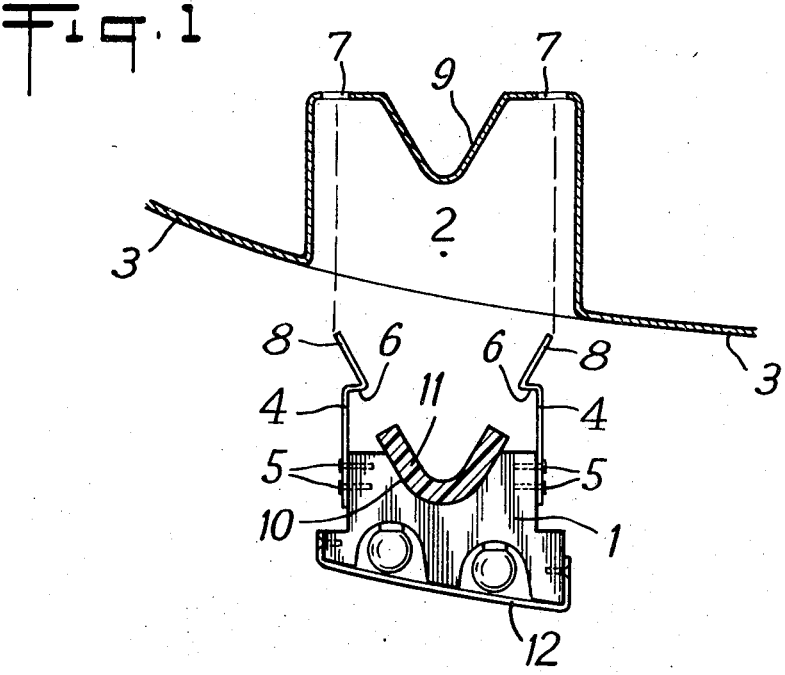
FIG. 1 is a fragmentary cross-sectional view showing the presentation of an element in front of a support adapted for receiving the element therein.

Referring now to the drawings, FIG. 1 shows an optical unit 1 arranged in front of a cavity 2 made in the bodywork of a vehicle, of which the outer section 3 is seen.

Resilient clips 4 are formed integrally or in a unitary manner with the optical unit 1 or may be secured thereto, as for example, fixed by screws 5. The free ends 8 of the clips 4 are each provided with a locking projection 6. Furthermore, the free ends 8 of the clips 4 may at times be placed into and penetrate apertures 7 provided in the base of the cavity 2, the spacing of or distance between the free ends 8 of the clip 4 being selected to correspond with the spacing between the apertures 7.

Moreover, as is known, the clips 4 are inclined obliquely with respect to the edges of the apertures 7.

Figure 2:
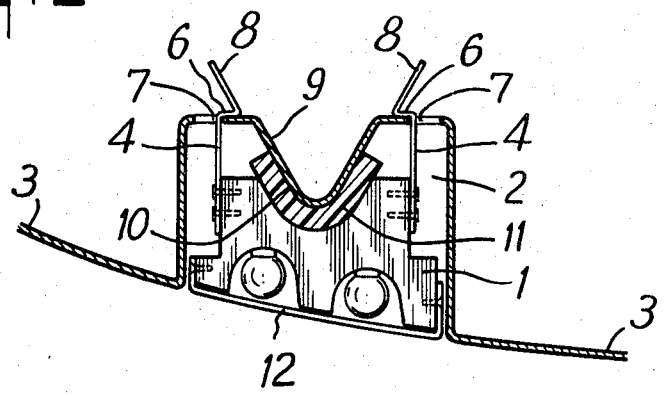
FIG. 2 is a section showing the element mounted and locked to the support.

It will also be noted that a centering boss 9, for example conical in shape, is formed integrally or in a unitary manner with the base of the cavity 2, and this configuration provides in that the shape of the base is appropriately shaped to accomplish the desired purpose. A depression 10, having a shape complementary to the boss 9, is formed integrally or in a unitary manner with the optical unit 1, whilst a support piece 11 made of resilient material is preferably interposed between the boss 9 and the depression 10 when the optical unit 1 is mounted to the bodywork 3 as shown in FIG. 2. In one embodiment, the support piece 11, made of elastomer, is glued by one of its faces either to the boss 9 or to the depression 10.

Finally, it will be noted from FIG. 2 that the outer face 12 of the optical unit is substantially coincident with the plane of the outer surface of the outer section 3 of the bodywork when the optical unit 1 is fixed to the bodywork by clips 4 received in aperture 7.

There are many advantages to be had from this mode of fixing.

Firstly, mounting the device is obviously effected rapidly. The optical unit 1 is held in front of the cavity 2, the free ends 8 of the resilient clips 4 are inserted by a simple thrusting movement axially into the respective apertures 7, the optical unit is then pushed into the cavity effecting the sides of the clips to rub along on the edges of the apertures 7 until the locking projections 6 engage the edges of the apertures 7. It is thus seen that, in brief, a simple thrusting operation is sufficient to securely mount the optical unit 1 within the bodywork.

It is advantageous to provide the resilient support piece 11 because when the optical unit 1 has been inserted into the cavity 2, the unit 1 may be slightly forced inwardly, squeezing the support piece 11, thus ensuring a solid engagement of the locking projections 6 with the edges of the apertures 7 when the inward thrust of insertion is removed and the support piece 11 expands substantially to its original shape.

If no support piece 11 is interposed between the boss 9 and the depression 10, the projections 6 may still be engaged on the edges of the apertures 7 as specified above, but the assembly must then be more accurately manufactured in order to ensure that the projections 6 hook properly.

It will be noted that when the optical unit 1 is mounted to the bodywork, the free ends 8 of the clips 4 are arranged inside the inner surface of the bodywork opposite the outer section 3. The ends 8 may therefore be accessible only from the inside of the vehicle bodywork, from the boot or trunk for a rear optical unit, or from the engine space for a front optical unit. It is necessary to open the corresponding covers in order to have access to the ends 8 and to be able to detach the unit from the bodywork. This point is very advantageous as it ensures safety against theft.

In order to reinforce this anti-theft measure, once the optical units 1 are mounted, the optical units 1 may be produced so that the outer face 12 and the outer surface of the outer section 3 are substantially arranged in a common plane surface after mounting is completed. In this way the optical unit 1 cannot even be gripped or grasped about the face 12 any longer after it has been mounted.

On the contrary, a conventional dismantling operation (by acting from the interior, on the free ends 8 of the resilient clips 4) has for its effect to release the energy accumulated by the compression of the resilient support piece 11, which, like a spring, reacts by setting off the ejection of the optical unit 1. This ejection enables the optical unit to project partially out of the cavity 2 and facilitates the prehension or grasping necessary for removal.

Moreover, the role of the boss 9 and depression 10 is understood with these members ensuring a good centering of the optical unit 1 in the cavity 2 as they correspond to one another in shape.

Several other advantageous characteristics of the modes of mounting according to the invention will also be noted. From these characteristics, the aesthetics of the vehicles equipped as described hereinabove is greatly improved by the elimination of the frame and support elements or conventional fixing screws, as by the smooth continuous outer surface of the bodywork at the location of the optical units 1.

The invention is not limited to the embodiment that has just been described, but covers on the contrary all the variants that may be made thereof without departing from its scope.

For example, the boss 9 may be formed unitary with the optical unit 1, the depression 10 then being formed unitary with the base of the cavity 2. These bosses and depressions may moreover be of a greater number than that of the embodiment given by way of example. It is also understood that the mounting device described for an optical unit 1 on the bodywork of a vehicle may advantageously be selected for mounting any element on a support, whatever the support.

Figure 3:
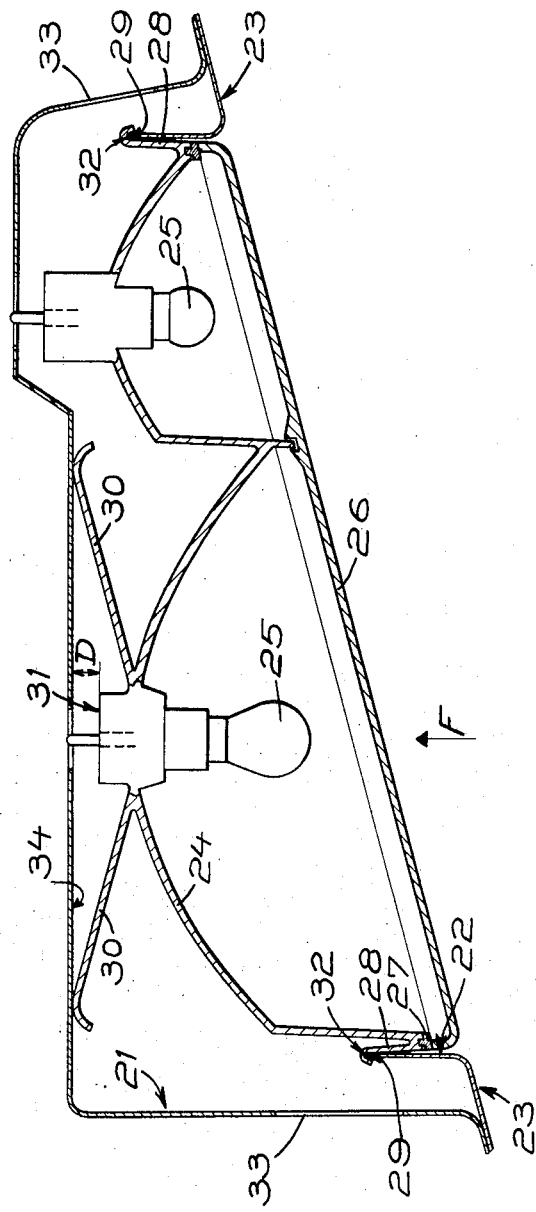
FIG. 3 is a fragmentary cross-sectional view of the alternate embodiment showing an optical unit element mounted on and secured to a bodywork support of a vehicle.

Referring to FIG. 3, there is illustrated an assembly comprising a cavity or recess 21, the opening 22 of which lies in the external surface 23 of the bodywork of a vehicle.

A housing 24 having lamp bulbs 25 supportedly mounted therein is completed by a transparent or transluscent cover 26, the cover being secured to the housing 24 through the intermediary of a seal 27. The housing 24 carries resilient clips 28 having free end portions 29 which serve to retain the housing in the cavity 21. Resilient flexible strips 30 are provided each having one end connected with a boss-like part 31 of the housing 24, with the opposite ends projecting at an inclination thereto adapted for engagement with the inner top wall surface 34 of housing 21.

The housing 24 is disposed in the cavity 21 and is secured on the bodywork by the free end portions 29 of clips 28 which cooperate to effect this action with inwardly-extending flanges 32 defining the opening 22. These flanges 32 are disposed opposite openings 33 provided in the sidewalls of the cavity 21. It will be noted that as assembled, the free ends of the flexible strips 30 are in abutment with the rear wall 34 of the cavity 21 and, moreover, the plane of the cover 26 lies substantially in the plane defined of the external surface 23 of the bodywork.

It will also be noted that when the housing 24 is secured on the bodywork and is situated in the configuration shown, the smallest distance D which separates the boss-like part 31 of the housing 24 from the wall 34 of the cavity 21 is equal to a value above zero. The flexibility of the strips 30 is such that under the action of a force exerted on the front face of the cover 26 in the direction of the arrow F, which tends to force the housing inwardly in the cavity 21, the boss-like part 31 can travel until it is substantially in abutment with the rear wall 34 whenever a force is exerted on the housing 24.

The principle advantage of the assembly which has just been described resides in this possibility of impact on the housing 24 being opposed by only a low resistance to the impact force exerted in the direction of the arrow F. This resistance is a function of the value of the stiffness of the flexible strips 30 which are selected such that this resistance is not substantially lower than the impact resistances of the cover 26 and the housing 24. In this way, on impact there will not result, as previously, damage generally by breakage of the cover 26 and the housing 24, but only a momentary inward retraction followed by an automatic restoration to the original location, the retraction caused not exceeding the distance D. This characteristic of the securing device, which has just been described, is very useful particularly for lighting units of vehicles, since it allows a longer life, in spite of light impacts which sometimes occur, such as when maneuvering the vehicle in a garage or in a parking space.

It will be apparent that the described embodiment in which the flexible strips 30 each have one end connected to the housing 24, is particularly simple and thus can readily be put into practice. However, the interposition of a flexible member between the housing 24 and the wall 34 of the cavity 21 only constitutes a preferred modification. It is likewise advantageous, but not essential, to use a plane wall 34.

It is to be understood that the form of this invention herewith shown and described is to be taken as preferred examples of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

I claim:

1. A device for mounting an element on a support, which comprises the support having an inner surface and an outer surface, the outer surface having a cavity accomodating therein the element in a manner such that the outer surface of the element substantially forms a continuation of the outer surface of the part of the support surrounding the cavity, the element including clips connected integrally with the element and adaptable to be inserted from the outside of the outer surface of the support into clip receiving means on the support, said clip receiving means being accessible only from the inner surface of the support, the clips being provided with projections for locking the element on the support an innermost portion of the element being spaced from the corresponding innermost portion of the cavity by a resilient member capable of flexing by an amount which permits the element to move until the innermost portion thereof and the innermost portion of the cavity are substantially in positive locking contact, whereby prehension of the element is prevented while resilient movement of the element into the cavity is permitted.

2. A device as claimed in claim 1 wherein the resilient member comprises at least one flexible strip.

3. A device as claimed in claim 2 wherein the flexible strip is formed integral with the rear face of the element.

4. A device as claimed in claim 2 wherein the flexible strip abuts with its free end the innermost portion of the cavity which has a substantially planar surface.

5. A device for mounting an element on a support, such as an assembly of a vehicle lighting unit on the bodywork of a vehicle, comprising a cavity formed in the bodywork, said element being a lighting unit engaged in the cavity, said lighting unit having a transparent or translucent cover thereof that is flush with the surrounding bodywork, said element having resilient arms having projections thereon adapted for engagement on flanges of the cavity to retain the unit in the cavity, the projections being accessible through openings in the cavity only from the interior of the bodywork to release the unit, the said element having flexible strips integral with a housing of the unit and biasing the rear surface of the unit away from the rear of the cavity so that the rear surface and the rear of the cavity are spaced apart, the flexible strips being capable of flexing to an extent that the rear surface and the rear of the cavity can approach substantially into contact with one another.

* * * * *